United States Patent
Stollhof et al.

(10) Patent No.: US 11,939,172 B2
(45) Date of Patent: Mar. 26, 2024

(54) METHOD FOR OPERATING A SUPPLY DEVICE, AND SUPPLY DEVICE

(71) Applicant: Koerber Supply Chain Automation Eisenberg GmbH, Eisenberg (DE)

(72) Inventors: Karlheinz Stollhof, Dannenfels (DE); Christopher Blasius, Boerrstadt (DE)

(73) Assignee: Koerber Supply Chain Automation Eisenberg GmbH, Eisenberg (DE)

( * ) Notice: Subject to any disclaimer, the term of this patent is extended or adjusted under 35 U.S.C. 154(b) by 240 days.

(21) Appl. No.: 17/442,674

(22) PCT Filed: Mar. 18, 2020

(86) PCT No.: PCT/EP2020/057484
§ 371 (c)(1),
(2) Date: Sep. 24, 2021

(87) PCT Pub. No.: WO2020/193319
PCT Pub. Date: Oct. 1, 2020

(65) Prior Publication Data
US 2022/0340374 A1    Oct. 27, 2022

(30) Foreign Application Priority Data
Mar. 28, 2019    (DE) .......................... 102019204389.5

(51) Int. Cl.
*B65G 47/31*    (2006.01)
*B65G 47/08*    (2006.01)
*B65G 47/90*    (2006.01)

(52) U.S. Cl.
CPC ........... *B65G 47/31* (2013.01); *B65G 47/084* (2013.01); *B65G 47/907* (2013.01)

(58) Field of Classification Search
CPC ..... B65G 47/31; B65G 47/084; B65G 47/907
(Continued)

(56) References Cited

U.S. PATENT DOCUMENTS

| 4,197,935 A * | 4/1980 | Aterianus | B65G 47/31 198/460.1 |
| 10,442,638 B2 * | 10/2019 | Kollmuss | B65G 47/086 |

(Continued)

FOREIGN PATENT DOCUMENTS

| DE | 102015210185 | 12/2016 |
| DE | 102016206659 | 10/2017 |

(Continued)

OTHER PUBLICATIONS

International Search Report for PCT/EP2020/057484 dated Jun. 24, 2020, 4 pages.

*Primary Examiner* — Gene O Crawford
*Assistant Examiner* — Lester Rushin, III
(74) *Attorney, Agent, or Firm* — Dority & Manning, P.A.

(57) ABSTRACT

The invention relates to a method for operating a supply device, comprising at least one feed conveyor, at least one intermediate conveyor, a discharge conveyor and at least one handling device, wherein individual products are continuously conveyed from the at least one feed conveyor to a work area of the at least one handling device. The invention relates to a supply device for forming an article layer from individual products and for transferring the article layer to a downstream device, comprising at least one feed conveyor, at least one intermediate conveyor, a discharge conveyor and at least one handling device, which is adapted for carrying out the method according to the invention.

10 Claims, 4 Drawing Sheets

(58) Field of Classification Search
USPC .............................................. 198/461.1, 426
See application file for complete search history.

(56) References Cited

U.S. PATENT DOCUMENTS

| | | | |
|---|---|---|---|
| 10,882,702 B2 | 1/2021 | Kirzinger et al. | |
| 10,894,673 B2* | 1/2021 | Frank .................. | B65G 47/244 |
| 2016/0297618 A1 | 10/2016 | Beesley | |

FOREIGN PATENT DOCUMENTS

| | | |
|---|---|---|
| DE | 102016206660 | 10/2017 |
| WO | WO2019011565 | 1/2019 |

* cited by examiner

METHOD FOR OPERATING A SUPPLY DEVICE, AND SUPPLY DEVICE

PRIORITY CLAIM

The present application claims the benefit of priority to PCT Application No. PCT/EP2020/057484, Filed Mar. 18, 2020, which is incorporated herein by reference for all purposes. The present application claims the benefit of German Patent Application No. 102019204389.5, filed Mar. 28, 2019, which is incorporated herein by reference for all purposes.

The invention relates to a method for operating a supply device, comprising at least one feed conveyor, at least one intermediate conveyor, a discharge conveyor and at least one handling device, wherein individual products are conveyed from the at least one feed conveyor to a work area of the at least one handling device, the products are displaced by the at least one handling device from the at least one feed conveyor onto the at least one continuously running intermediate conveyor for forming an article layer, and the article layer is transferred from the at least one intermediate conveyor to the discharge conveyor. The invention further relates to a supply device for forming an article layer from individual products and for transferring the article layer to a downstream device which comprises at least one feed conveyor, at least one intermediate conveyor, a discharge conveyor and at least one handling device.

PRIOR ART

A supply device is used to put individual products together to form an article layer according to a defined placement pattern and subsequently to transfer the finished article layer to a downstream device, for example a palletizing device. A supply device suitable for this purpose comprises, for example, a feed conveyor from which the individual products are conveyed to a work area of a handling device, an intermediate conveyor onto which the individual products are displaced by the handling device to form an article layer, and a discharge conveyor onto which the article layer from the intermediate conveyor is transferred and which transfers the finished article layer to the downstream device.

The individual products can arrive at the supply device in a single row or multiple rows one behind the other via one or more feed conveyors and can be moved there and/or put together to form stackable article layers. The stackable article layers are then transferred one after the other to the downstream device, for example a palletizing device, which places the stackable article layers onto a desired stacking place, in particular onto a pallet.

The document DE 10 2015 210 185 A1 discloses a device and a method for producing a defined layer pattern from multiple piece goods. Here, the piece goods are transported on at least two horizontal conveying devices with conveying directions oriented parallel to each other and are guided in the direction of a work system. The piece goods are selectively received by the work system, rotated and/or offset diagonally. This creates a predefined formation on a formation belt. The predefined formation of piece goods is then transferred from the formation belt to a layer forming belt, where a palletizable layer is formed from the predefined formation.

The document DE 10 2016 206 639 A1 discloses a device and a method for handling piece goods moved one behind the other. Here, directly successive piece goods are transported as a closed formation in a row, individual piece goods are grasped and brought into a defined relative target position. The device used for this purpose comprises a manipulator for piece goods and a transport device via which the piece goods are transported into a grasping area of the manipulator.

The document DE 10 2016 206 659 A1 also discloses a method and a device for handling piece goods moved one behind the other. Here, directly successive piece goods are transported in multiple rows as a closed formation, individual piece goods are grasped and brought into a defined relative target position. The device used for this purpose comprises a manipulator for piece goods and at least two transport devices via which the piece goods are transported into a grasping area of the manipulator.

The document DE 10 2016 206 660 A1 also discloses a device and a method for handling piece goods moved one behind the other. Here, directly successive piece goods are transported as a closed formation in a row, individual piece goods are grasped by means of multiple manipulators and brought into a defined relative target position. The device used for this purpose comprises multiple manipulators for piece goods and a transport device via which the piece goods are transported into a grasping area of the manipulator.

OBJECT OF THE INVENTION

It is an object of the present invention to improve a supply device of the aforementioned type. In particular, it is an object of the invention to increase the speed during the formation and transfer of the article layers and to ensure a precise transfer of the article layers to a downstream device, for example a palletizing device.

Solution

This object is achieved by a method for operating a supply device with the features of claim 1. Advantageous configurations and refinements of the invention are the subject matter of the subclaims.

A generic supply device by means of which individual products can be put together to form an article layer and can be transferred to a downstream device comprises at least one feed conveyor, at least one intermediate conveyor, a discharge conveyor and at least one handling device.

According to a generic method for operating the supply device, individual products are continuously conveyed from the at least one feed conveyor to a work area of the at least one handling device. The products are displaced by the at least one handling device from the at least one feed conveyor onto the at least one continuously running intermediate conveyor for forming an article layer according to a placement pattern. The article layer is then transferred from the at least one intermediate conveyor to the discharge conveyor.

The feed conveyor and the intermediate conveyor run continuously and convey the products in one transport direction. In this context, this means that the conveyors in question run continuously during the operation of the supply device and do not come to a standstill. However, the conveyors do not necessarily have to run at a constant speed. Only if no further products are delivered, the feed conveyor as well as the intermediate conveyor can stop. Depending on the requirements of the downstream components, the discharge conveyor can also be operated continuously or at a timed rate.

The transport direction runs horizontal and parallel to a floor on which the supply device is positioned. A vertical direction extends perpendicular to the floor and thus also perpendicular to the transport direction. A transverse direction extends perpendicular to the vertical direction and perpendicular to the transport direction. Thus, the transverse direction also extends horizontally and parallel to the floor.

According to the invention, it is provided that during the formation of the article layer, the at least one intermediate conveyor runs at a transfer speed, that during the transfer of the article layer from the at least one intermediate conveyor to the discharge conveyor, the at least one intermediate conveyor and the discharge conveyor run at an equal speed, and that after the formation of the article layer, the discharge conveyor is accelerated to a discharge speed which is greater than the transfer speed.

Thus, the article layer is formed on the intermediate conveyor according to the placement pattern and is already transferred to the discharge conveyor during formation. Since the intermediate conveyor and the discharge conveyor run at an equal speed during the transfer of the article layer, the article layer can be situated partly on the intermediate conveyor and partly on the discharge conveyor, wherein the placement pattern of the article layer is maintained.

According to an advantageous configuration of the invention, during the transfer of the article layer from the at least one intermediate conveyor to the discharge conveyor, the at least one intermediate conveyor and the discharge conveyor run at the transfer speed. After the transfer of the article layer, the discharge conveyor is accelerated to the discharge speed. The at least one intermediate conveyor continues to run at the transfer speed, for example. The discharge conveyor is not accelerated until the article layer is situated completely on the discharge conveyor. In doing so, the placement pattern of the article layer is maintained. When the article layer is situated completely on the discharge conveyor, the formation of a further article layer is already started on the intermediate conveyor. The article layer can thus be transferred to the downstream device at a discharge speed that is higher than the transfer speed.

In the case of placement patterns of very different sizes, it is also possible that the first article layer can be formed completely on the intermediate conveyor. Then, the next article layer can already be started during the transfer to the discharge conveyor so that at this moment, two article layers are placed partially on the intermediate conveyor.

According to another advantageous configuration of the invention, the discharge conveyor and the at least one intermediate conveyor are accelerated to the discharge speed during the transfer of the article layer from the at least one intermediate conveyor to the discharge conveyor, but only after the article layer is formed. Thus, when the article layer is completely formed, the discharge conveyor and the intermediate conveyor are accelerated to the discharge speed simultaneously. In doing so, the placement pattern of the article layer is maintained. The article layer can thus be transferred to the discharge conveyor and to the downstream device at a higher discharge speed compared to the transfer speed. After the transfer of the article layer from the at least one intermediate conveyor to the discharge conveyor, the at least one intermediate conveyor is preferably decelerated again to the transfer speed.

Advantageously, the discharge conveyor running at the discharge speed transfers the article layer to a downstream device, in particular to a palletizing device, which places the article layer on a pallet or on a pallet stack, for example. After the transfer of the article layer to the downstream device, the discharge conveyor is then decelerated again to the transfer speed. In particular, the discharge conveyor is decelerated again to the transfer speed before another article layer, the formation of which has already been started on the intermediate conveyor, is transferred from the intermediate conveyor to the discharge conveyor.

According to an advantageous configuration of the invention, the supply device comprises a first feed conveyor running at a first infeed speed and a second feed conveyor running at a second infeed speed. The first feed conveyor and the second feed conveyor are preferably arranged offset parallel to each other in a transverse direction.

According to a possible configuration of the invention, the first infeed speed is equal to the second infeed speed. According to another possible configuration of the invention, the first infeed speed is different from the second infeed speed. In particular, the first infeed speed and the second infeed speed can be adapted to a frequency of the products conveyed by the respective feed conveyor.

According to an advantageous refinement of the invention, the supply device comprises a third feed conveyor running at a third infeed speed. In this case, the third feed conveyor is preferably arranged in the transverse direction between the first feed conveyor and the second feed conveyor.

In this case, the third infeed speed is different from the first infeed speed and/or from the second infeed speed. The first infeed speed, the second infeed speed and the third infeed speed can in particular be adapted to a frequency of the products conveyed by the respective feed conveyor.

According to a possible configuration of the invention, the at least one intermediate conveyor is arranged in the transverse direction between the first feed conveyor and the second feed conveyor. As a result, the work paths of the handling device when displacing the products to form the article layer are relatively short.

According to an advantageous refinement of the invention, the supply device comprises a first intermediate conveyor and a second intermediate conveyor. The first intermediate conveyor and the second intermediate conveyor both run at the transfer speed, thus, at an equal speed. As a result, the article layer can be partly situated on the first intermediate conveyor and partly on the second intermediate conveyor, wherein the placement pattern of the article layer is maintained.

Here, the first intermediate conveyor is arranged in the transport direction between the second intermediate conveyor and the discharge conveyor. The second intermediate conveyor, the first intermediate conveyor and the discharge conveyor are thus arranged one behind the other in the transport direction. During the formation of the article layer, the individual products are placed partly on the first intermediate conveyor and partly on the second intermediate conveyor.

According to a possible configuration of the invention, the at least one intermediate conveyor is arranged in the transport direction between the at least one feed conveyor and the discharge conveyor. As a result, the extent of the supply device in the transverse direction can advantageously be reduced to the extent of the discharge conveyor in the transverse direction.

According to a preferred configuration of the invention, a number of products are rotated about an axis extending in the vertical direction for forming the article layer according to the placement pattern. This allows the products to be displaced according to the placement pattern, regardless of their orientation on the at least one feed conveyor. Even complicated placement patterns can thus be implemented.

Preferably, the at least one handling device has an at least approximately circular work area which extends in the transport direction and in the transverse direction over at least part of the at least one feed conveyor and over at least part of the at least one intermediate conveyor. Thus, during the formation of the article layer, the handling device can pick up the individual products from the feed conveyor and place them onto the intermediate conveyor according to the placement pattern.

The object is further achieved by a supply device with the features of claim 10.

A supply device according to the invention for forming an article layer from individual products and for transferring the article layer to a downstream device comprises at least one feed conveyor, at least one intermediate conveyor, a discharge conveyor and at least one handling device. Here, the supply device is adapted for carrying out the method according to the invention.

FIGURES AND EMBODIMENTS OF THE INVENTION

In the following, the invention is explained in more detail with reference to advantageous exemplary embodiments shown in the figures. However, the invention is not limited to these exemplary embodiments. The figures illustrate the subject matter of the invention only schematically. In the figures.

Figure 1:
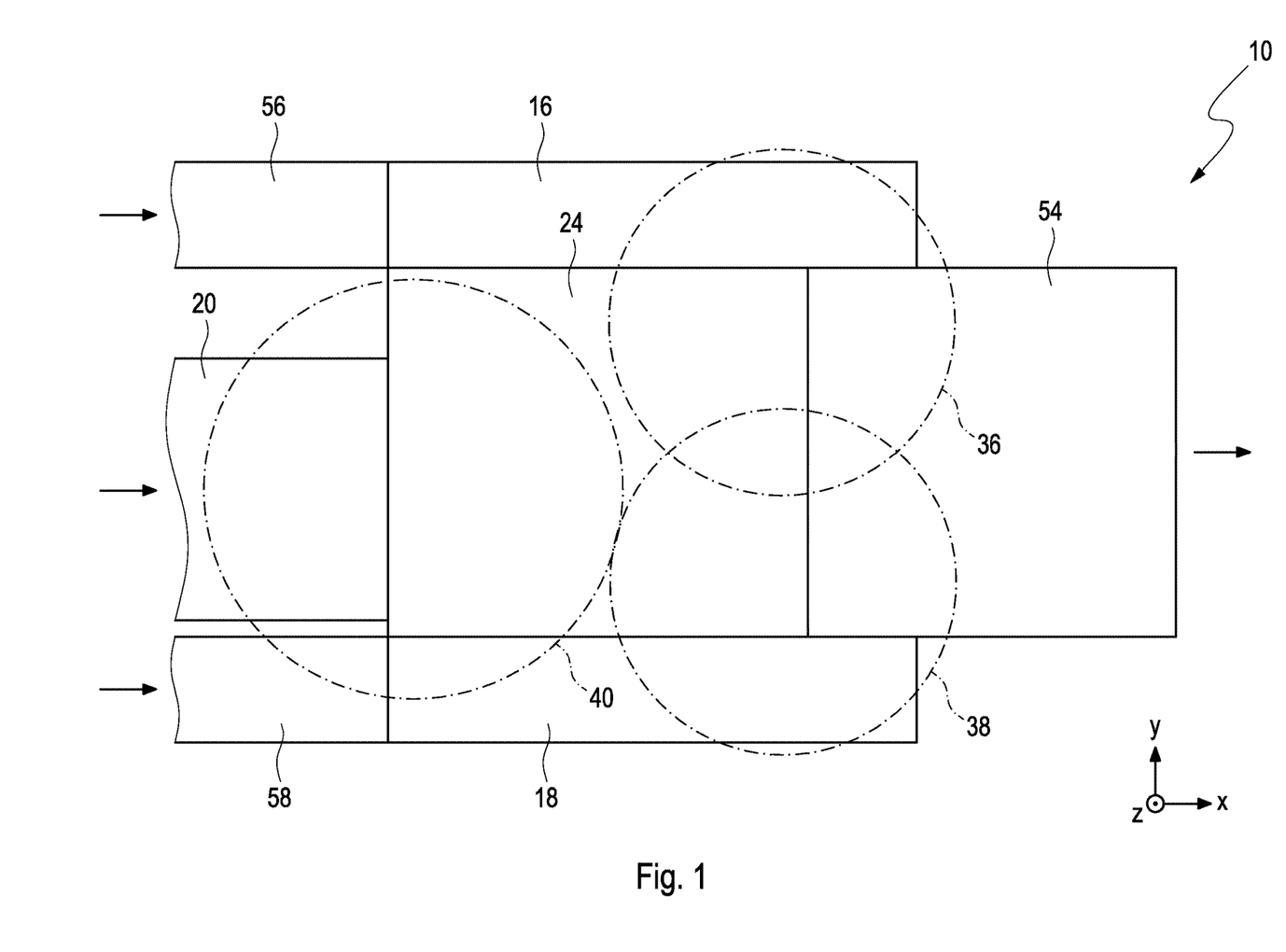
FIG. 1 shows a schematic top view of a supply device according to a first exemplary embodiment.

FIG. 1 shows a schematic top view of a supply device 10 according to a first exemplary embodiment. By means of the supply device 10, individual products 12, not shown here, are put together to form an article layer 14, likewise not shown here. The article layer 14 is then transferred to a downstream device, for example a palletizing device, likewise not shown here.

The supply device 10 comprises a first feed conveyor 16, a second feed conveyor 18 and a third feed conveyor 20. The feed conveyors 16, 18, 20 are configured in the form of conveyor belts and convey the products 12 in a transport direction x. The transport direction x runs horizontally and parallel to a floor on which the supply device 10 is positioned. A vertical direction z extends perpendicular to the floor and thus also perpendicular to the transport direction x. A transverse direction y extends perpendicular to the vertical direction z and perpendicular to the transport direction x. Thus, the transverse direction y also extends horizontally and parallel to the floor.

The first feed conveyor 16 runs at a first infeed speed. The second feed conveyor 18 runs at a second infeed speed. The third feed conveyor 20 runs at a third infeed speed. The first infeed speed can be different from the second infeed speed. The third infeed speed may be different from both the first infeed speed and the second infeed speed. Thus, the products 12 can be conveyed by the feed conveyors 16, 18, 20 at different infeed speeds.

The first feed conveyor 16 and the second feed conveyor 18 are arranged offset parallel to each other in the transverse direction y. The third feed conveyor 20 is arranged in the transverse direction y between the first feed conveyor 16 and the second feed conveyor 18. In the present case, the third feed conveyor 20 is arranged offset from the first feed conveyor 16 and the second feed conveyor 18 in the transport direction x.

A first pre-conveyor 56, which is configured in the form of a conveyor belt, is arranged upstream of the first feed conveyor 16 in the transport direction x. The products 12 are transferred from the first pre-conveyor 56 to the first feed conveyor 16. A second pre-conveyor 58, which is also configured in the form of a conveyor belt, is arranged upstream of the second feed conveyor 18 in the transport direction x. The products 12 are transferred from the second pre-conveyor 58 to the second feed conveyor 18.

The supply device 10 further comprises a first intermediate conveyor 24, which is also configured in the form of a conveyor belt. The first intermediate conveyor 24 is arranged in the transverse direction y between the first feed conveyor 16 and the second feed conveyor 18. The first intermediate conveyor 24 is arranged offset from the third feed conveyor 20 in the transport direction x. The supply device 10 further comprises a discharge conveyor 54, which is also configured in the form of a conveyor belt. The discharge conveyor 54 is used to transfer the finished article layer 14 to the downstream device, in particular a palletizing device. The first intermediate conveyor 24 is arranged in the transport direction x between the third feed conveyor 20 and the discharge conveyor 54.

Furthermore, the supply device 10 comprises a first handling device 30, which is not shown here. The first handling device 30 has a circular first work area 36 which extends in the transport direction x and in the transverse direction y over part of the first feed conveyor 16 and over part of the first intermediate conveyor 24.

Furthermore, the supply device 10 comprises a second handling device 32, which is not shown here. The second handling device 32 comprises a circular second work area 38, which extends in the transport direction x and in the transverse direction y over part of the second feed conveyor 18 and over part of the first intermediate conveyor 24.

Furthermore, the supply device 10 comprises a third handling device 34, which is not shown here. The third handling device 34 has a circular third work area 40 which extends in the transport direction x and in the transverse direction y over part of the third feed conveyor 20, over part of the second feed conveyor 18 and over part of the first intermediate conveyor 24.

Figure 2:
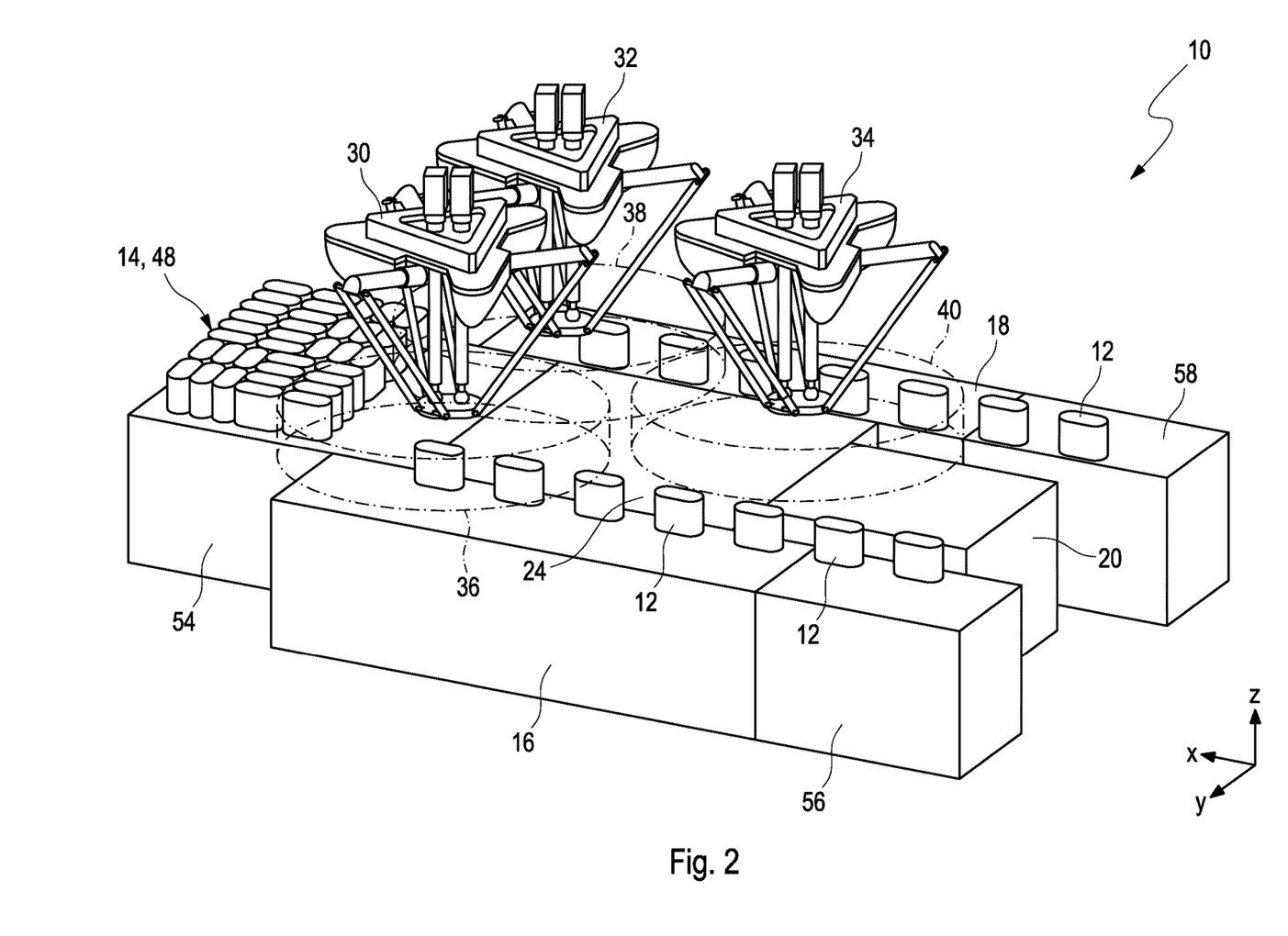
FIG. 2 shows a schematic perspective view of the supply device according to the first exemplary embodiment of FIG. 1.

FIG. 2 shows a schematic perspective view of the supply device 10 according to the first exemplary embodiment of FIG. 1. The first handling device 30, the second handling device 32 and the third handling device 34 are configured here as robots, for example in the form of delta robots or hexapods.

During operation of the supply device 10, the individual products 12 are continuously conveyed from the feed conveyors 16, 18, 20 to the work areas 36, 38, 40 of the handling devices 30, 32, 34. The products 12 are then displaced by the handling devices 30, 32, 34 from the feed conveyors 16, 18, 20 onto the continuously running first intermediate conveyor 24 to form an article layer 14 according to a placement pattern 48. In doing so, a number of products 12 are rotated about an axis extending in a vertical direction z to form the article layer 14 according to the placement pattern 48.

The article layer 14 is then transferred from the first intermediate conveyor 24 to the discharge conveyor 54. During the transfer of the article layer 14 from the first intermediate conveyor 24 to the discharge conveyor 54, the first intermediate conveyor 24 and the discharge conveyor 54 run at an equal transfer speed. After the transfer of the article layer 14 from the first intermediate conveyor 24 to the discharge conveyor 54, the discharge conveyor 54 is accelerated to a discharge speed that is greater than the transfer speed.

In the illustration shown here, an article layer 14 has just been transferred to the discharge conveyor 54 and is still there. The article layer 14 is transferred from the discharge conveyor 54 running at the discharge speed to a downstream device, in particular to a palletizing device. After the transfer of the article layer 14 to the downstream device, the discharge conveyor 54 is then decelerated again to the transfer speed before another article layer 14 is transferred from the first intermediate conveyor 24 to the discharge conveyor 54.

Figure 3:
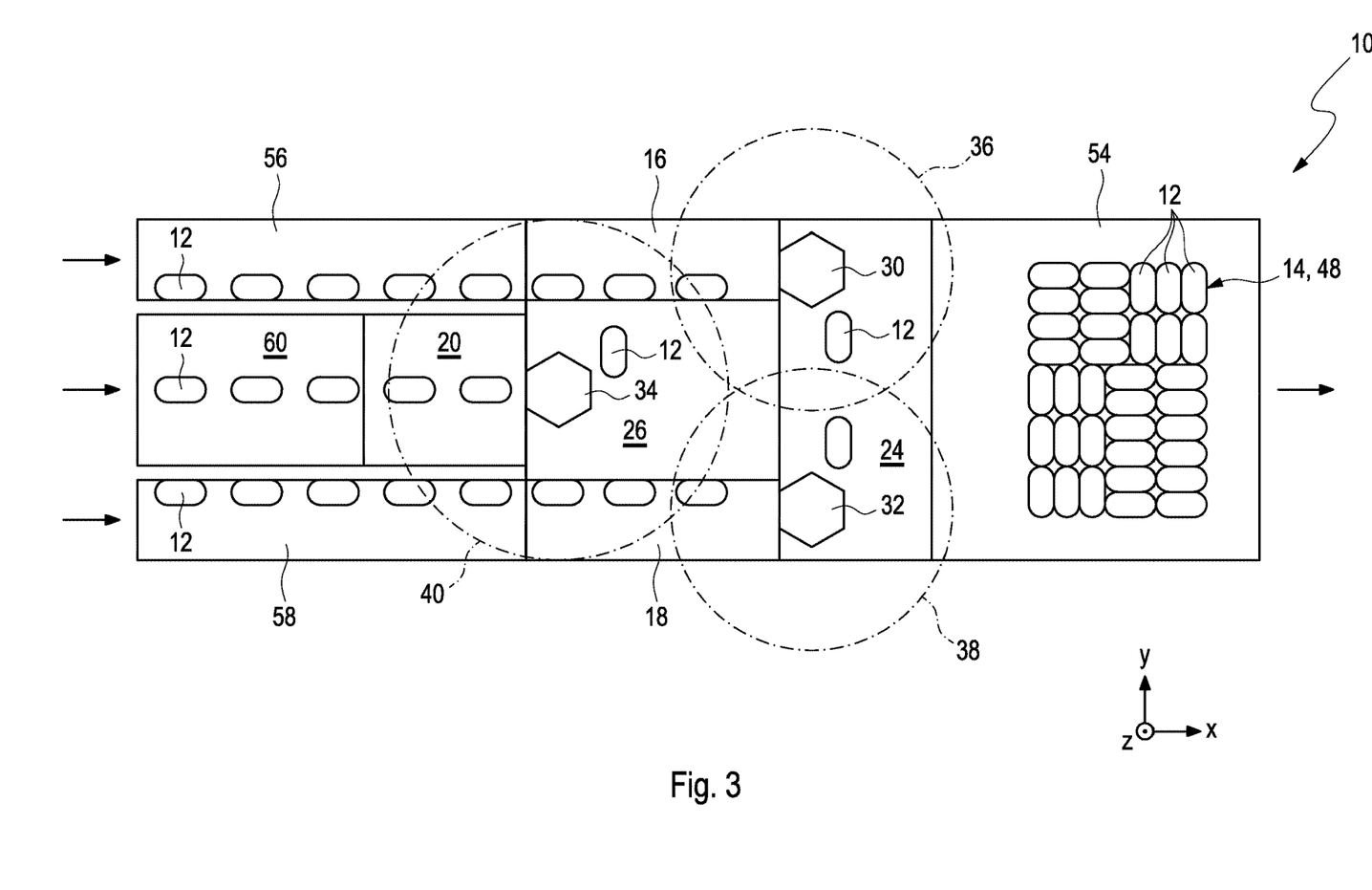
FIG. 3 shows a schematic top view of a supply device according to a second exemplary embodiment.

FIG. 3 shows a schematic top view of a supply device 10 according to a second exemplary embodiment. By means of the supply device 10, the individual products 12 are put together to form an article layer 14. The article layer 14 is then transferred to a downstream device, for example a palletizing device, which is not shown here.

The supply device 10 comprises a first feed conveyor 16, a second feed conveyor 18 and a third feed conveyor 20. The feed conveyors 16, 18, 20 are configured in the form of conveyor belts and convey the products 12 in a transport direction x.

The first feed conveyor 16 runs at a first infeed speed. The second feed conveyor 18 runs at a second infeed speed. The third feed conveyor 20 runs at a third infeed speed. The first infeed speed can be different from the second infeed speed. The third infeed speed can be different from both the first infeed speed and the second infeed speed. Thus, the products 12 can be conveyed by the feed conveyors 16, 18, 20 at different infeed speeds.

The first feed conveyor 16 and the second feed conveyor 18 are arranged offset parallel to each other in the transverse direction y. The third feed conveyor 20 is arranged between the first feed conveyor 16 and the second feed conveyor 18 in the transverse direction y. In the present case, the third feed conveyor 20 is arranged offset from the first feed conveyor 16 and the second feed conveyor 18 in the transport direction x.

A first pre-conveyor 56 configured in the form of a conveyor belt is arranged upstream of the first feed conveyor 16 in the transport direction x. The products 12 are transferred from the first pre-conveyor 56 to the first feed conveyor 16. A second pre-conveyor 58, which is also configured in the form of a conveyor belt, is arranged upstream of the second feed conveyor 18 in the transport direction x. The products 12 are transferred from the second pre-conveyor 58 to the second feed conveyor 18. A third pre-conveyor 60, which is also configured in the form of a conveyor belt, is arranged upstream of the third feed conveyor 20 in the transport direction x. The products 12 are transferred from the third pre-conveyor 60 to the third feed conveyor 20.

The supply device 10 comprises a first intermediate conveyor 24, which is configured in the form of a conveyor belt, and a second intermediate conveyor 26, which is also configured in the form of a conveyor belt. The two intermediate conveyors 24, 26 run at the transfer speed, thus at an equal speed.

The second intermediate conveyor 26 is arranged in the transport direction x between the third feed conveyor 20 and the first intermediate conveyor 24. The second intermediate conveyor 26 is arranged in the transverse direction y between the first feed conveyor 16 and the second feed conveyor 18.

The supply device 10 further comprises a discharge conveyor 54, which is also configured in the form of a conveyor belt. The discharge conveyor 54 is used to transfer the finished article layer 14 to the downstream device, in particular a palletizing device.

The first intermediate conveyor 24 is arranged in the transport direction x between the second intermediate conveyor 26 and the discharge conveyor 54. The second intermediate conveyor 26, the first intermediate conveyor 24 and the discharge conveyor 54 are thus arranged one behind the other in the transport direction x.

Furthermore, the supply device 10 comprises a first handling device 30. The first handling device 30 has a circular first work area 36 which extends in the transport direction x and in the transverse direction y over part of the first feed conveyor 16, part of the first intermediate conveyor 24 and over part of the second intermediate conveyor 26.

Furthermore, the supply device 10 comprises a second handling device 32. The second handling device 32 has a circular second work area 38 which extends in the transport direction x and in the transverse direction y over part of the second feed conveyor 18, part of the first intermediate conveyor 24 and over part of the second intermediate conveyor 26.

Furthermore, the supply device 10 comprises a third handling device 34. The third handling device 34 has a circular third work area 40 which extends in the transport direction x and in the transverse direction y over part of the third feed conveyor 20, over part of the first feed conveyor 16, over part of the second feed conveyor 18 and over part of the second intermediate conveyor 26.

Here, the first handling device 30, the second handling device 32 and the third handling device 34 are configured as robots, for example in the form of delta robots or hexapods.

During operation of the supply device 10, the individual products 12 are continuously conveyed from the feed conveyors 16, 18, 20 to the work areas 36, 38, 40 of the handling devices 30, 32, 34. The products 12 are then displaced by the handling devices 30, 32, 34 from the feed conveyors 16, 18, 20 to the continuously running intermediate conveyors 24, 26 to form an article layer 14 according to a placement pattern 48. In doing so, a number of products 12 are rotated about an axis extending in the vertical direction z to form the article layer 14 according to the placement pattern 48.

The article layer 14 is then transferred from the intermediate conveyors 24, 26 to the discharge conveyor 54. During the transfer of the article layer 14 from the first intermediate conveyor 24 to the discharge conveyor 54, the first intermediate conveyor 24 and the discharge conveyor 54 run at an equal transfer speed. After the transfer of the article layer 14 from the first intermediate conveyor 24 to the discharge conveyor 54, the discharge conveyor 54 is accelerated to a discharge speed that is greater than the transfer speed.

In the illustration shown here, an article layer 14 has just been transferred to the discharge conveyor 54 and is still there. The article layer 14 is transferred from the discharge conveyor 54 running at the discharge speed to a downstream device, in particular to a palletizing device. After the transfer of the article layer 14 to the downstream device, the discharge conveyor 54 is then decelerated again to the transfer speed before another article layer 14 is transferred from the first intermediate conveyor 24 to the discharge conveyor 54.

In the illustration shown here, further products 12 have already been displaced from the handling devices 30, 32, 34 onto the first intermediate conveyor 24 and onto the second intermediate conveyor 26 in order to form a further article layer 14.

Figure 4:
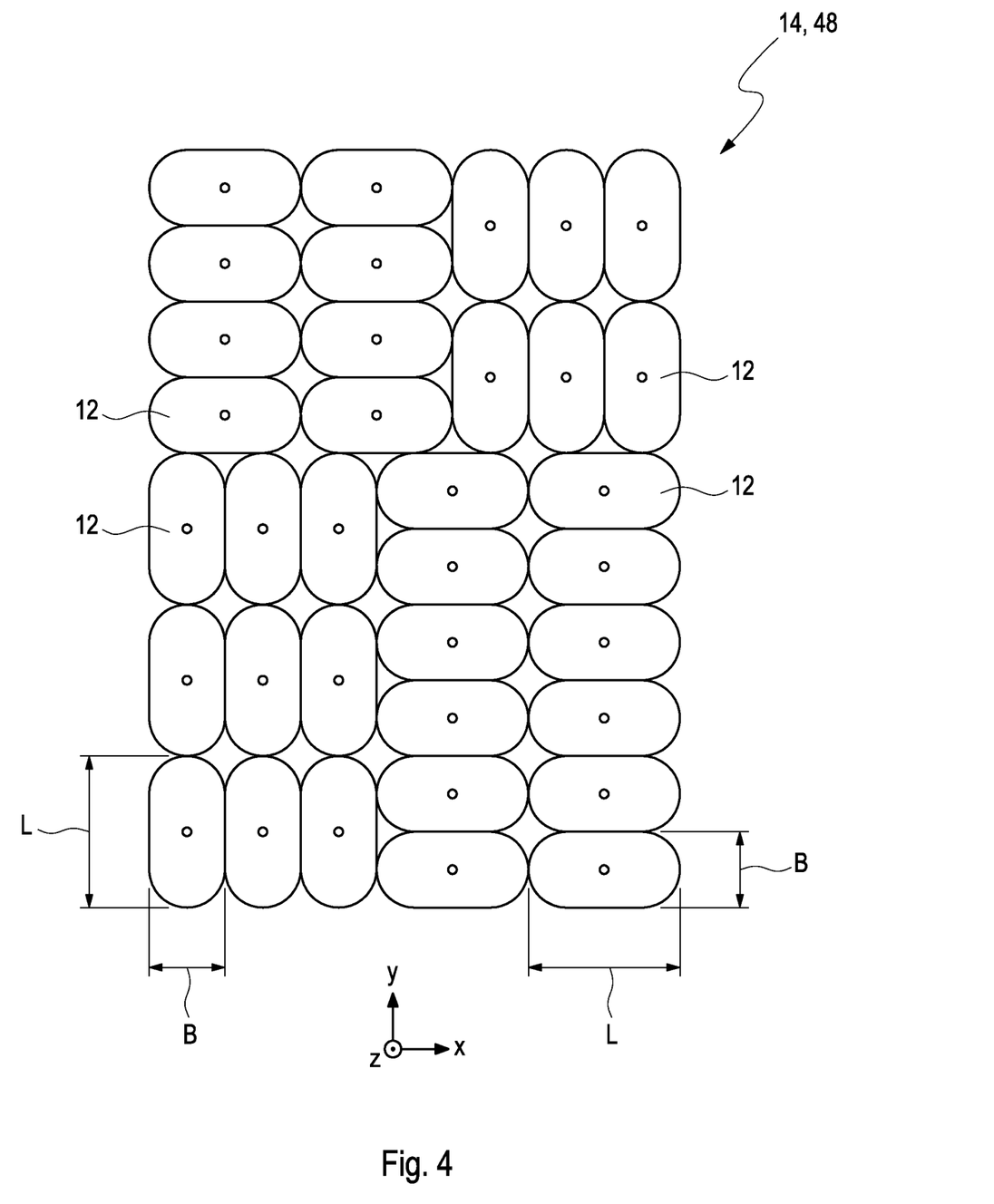
FIG. 4 shows a schematic illustration of a placement pattern.

FIG. 4 shows a schematic illustration of an exemplary placement pattern 48 of an article layer 14. Of course, differently designed placement patterns 48 of article layers 14 are conceivable, which can also be created by means of a supply device according to both the first exemplary embodiment and the second exemplary embodiment.

In the present case, the products 12 each have a cylindrical shape with an approximately rectangular but not square footprint. Edges of the products 12 extending in the vertical direction z are rounded. The products 12 thus have a length L which is different from a width B. In particular, the products 12 are not rotationally symmetrical.

In the placement pattern 48 shown here, some products 12 are arranged in such a manner that their length L is oriented parallel to the transport direction x and their width B is oriented parallel to the transverse direction y. Other products 12 are arranged in such a manner that their width B is oriented parallel to the transport direction x and their length L is oriented parallel to the transverse direction y.

In particular, rotationally symmetrical products 12 or buckets can also be handled with this device, since the products 12 are gripped and displaced only once and are not displaced with classical pushing devices or railings, in which case they could become twisted.

The invention is not limited to the exemplary embodiments described herein and the aspects emphasized therein. Rather, within the scope specified by the claims, a variety of modifications is possible, all of which lie within the common knowledge of the person skilled in the art.

REFERENCE LIST 10 supply device
12 product
14 article layer
16 first feed conveyor
18 second feed conveyor
20 third feed conveyor
24 first intermediate conveyor
26 second intermediate conveyor
30 first handling device
32 second handling device
34 third handling device
36 first work area
38 second work area
40 third work area
48 placement pattern
54 discharge conveyor
56 first pre-conveyor
58 second pre-conveyor
60 third pre-conveyor
L length
B width
x transport direction
y transverse direction
z vertical direction

The invention claimed is:

1. A method for operating a supply device, the supply device comprising at least one feed conveyor, at least one intermediate conveyor, a discharge conveyor and at least one handling device, wherein individual products are continuously conveyed from the at least one feed conveyor to a work area of the at least one handling device; the method comprising:

displacing the products by the at least one handling from the at least one feed conveyor onto the at least one continuously running intermediate conveyor for forming an article layer according to a placement pattern;
wherein the article layer is transferred from the at least one intermediate conveyor to the discharge conveyor,
wherein during the formation of the article layer, the at least one intermediate conveyor runs at a transfer speed, in that during the transfer of the article layer, the at least one intermediate conveyor and the discharge conveyor run at an equal speed, wherein during the transfer of the article layer, the discharge conveyor and the at least one intermediate conveyor are accelerated to the discharge speed, and in that after the formation of the article layer, the discharge conveyor is accelerated to a discharge speed which is greater than the transfer speed, and in that the supply device comprises a first feed conveyor running at a first infeed speed and a second feed conveyor running at a second infeed speed, wherein the at least one handling device has an at least approximately circular work area which extends in a transport direction and in a transverse direction (y) over at least part of the at least one feed conveyor and over at least part of the at least one intermediate conveyor.

2. The method as claimed in claim 1, wherein during the transfer of the article layer, the at least one intermediate conveyor and the discharge conveyor run at the transfer speed, and in that after the transfer of the article layer, the discharge conveyor is accelerated to the discharge speed.

3. The method as claimed in claim 1, wherein the article layer is transferred from the discharge conveyor running at the discharge speed to a downstream device, and after the transfer of the article layer to the downstream device, the discharge conveyor is decelerated to the transfer speed.

4. The method as claimed in claim 1, wherein the first infeed speed is different from the second infeed speed.

5. The method as claimed in claim 1, wherein the supply device comprises a third feed conveyor running at a third infeed speed, wherein the third infeed speed is different from the first infeed speed and/or from the second infeed speed.

6. The method as claimed in claim 1, wherein the at least one intermediate conveyor is arranged in a transverse direction between the first feed conveyor and the second feed conveyor.

7. The method as claimed in claim 1, wherein the supply device comprises a first intermediate conveyor and a second intermediate conveyor both running at the transfer speed, wherein the first intermediate conveyor is arranged in a transport direction between the second intermediate conveyor and the discharge conveyor.

8. The method as claimed in claim 1, wherein the at least one intermediate conveyor is arranged in a transport direction between the at least one feed conveyor and the discharge conveyor.

9. The method as claimed in claim 1, wherein a number of products are rotated about an axis extending in the vertical direction for forming the article layer according to the placement pattern.

10. A supply device for forming an article layer from individual products and for transferring the article layer to a downstream device, comprising at least one feed conveyor, at least one intermediate conveyor, a discharge conveyor and at least one handling device, wherein the supply device is designed for carrying out the method for operating the supply device, wherein at least one feed conveyor, at least one intermediate conveyor, a discharge conveyor and at least one handling device are provided, wherein individual products are continuously conveyed from the at least one feed conveyor to a work area of the at least one handling device; the products are displaced by the at least one handling device from the at least one feed conveyor onto the at least one continuously running intermediate conveyor for forming an article layer according to a placement pattern; the article layer is transferred from the at least one intermediate conveyor to the discharge conveyor, wherein during the formation of the article layer, the at least one intermediate conveyor runs at a transfer speed, that during the transfer of the article layer, the at least one intermediate conveyor and the discharge conveyor run at an equal speed, wherein during the transfer of the article layer, the discharge conveyor and the at least one intermediate conveyor are accelerated to the discharge speed, that after the formation of the article layer, the discharge conveyor is accelerated to a discharge speed which is greater than the transfer speed, and that the supply device comprises a first feed conveyor running at a first infeed speed and a second feed conveyor running at a second infeed speed, wherein the at least one handling device has an at least approximately circular work area which extends in a transport direction and in a transverse direction over at least part of the at least one feed conveyor and over at least part of the at least one intermediate conveyor.

* * * * *